United States Patent
Amano

(10) Patent No.: US 7,944,109 B2
(45) Date of Patent: May 17, 2011

(54) STATOR OF MOTOR HAVING AN INSULATOR WITH LEAD OUT GUIDE PORTIONS

(75) Inventor: Ryuichiro Amano, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 1005 days.

(21) Appl. No.: 10/577,067

(22) PCT Filed: Feb. 2, 2005

(86) PCT No.: PCT/JP2005/001506
§ 371 (c)(1),
(2), (4) Date: Apr. 24, 2006

(87) PCT Pub. No.: WO2005/076437
PCT Pub. Date: Aug. 18, 2005

(65) Prior Publication Data
US 2009/0102310 A1     Apr. 23, 2009

(30) Foreign Application Priority Data
Feb. 6, 2004   (JP) ................. 2004-030263

(51) Int. Cl.
  *H02K 3/00*   (2006.01)
  *H02K 3/28*   (2006.01)
  *H02K 1/00*   (2006.01)
(52) U.S. Cl. .......... 310/179; 310/71; 310/180; 310/184; 310/216.115

(58) Field of Classification Search .............. 310/71, 310/179, 180, 184, 216.115; *H02K 3/28*
See application file for complete search history.

(56) References Cited

U.S. PATENT DOCUMENTS

| 6,177,751 | B1 * | 1/2001 | Suzuki et al. | 310/269 |
| 7,701,102 | B2 | 4/2010 | Amano | |
| 2002/0043886 | A1 * | 4/2002 | Fujita et al. | 310/201 |
| 2002/0135259 | A1 * | 9/2002 | Eggers et al. | 310/216 |
| 2003/0020344 | A1 * | 1/2003 | Futami et al. | 310/71 |
| 2003/0102765 | A1 * | 6/2003 | Knoll et al. | 310/218 |

FOREIGN PATENT DOCUMENTS

| JP | 2001-218407 A | | 8/2001 |
| JP | 2002-101596 A | | 4/2002 |
| JP | 2002-247792 A | | 8/2002 |
| JP | 2003134716 A | * | 5/2003 |
| JP | 2003-219593 A | | 7/2003 |
| JP | 2003219593 A | * | 7/2003 |

* cited by examiner

*Primary Examiner* — Quyen Leung
*Assistant Examiner* — Michael Andrews
(74) *Attorney, Agent, or Firm* — Global IP Counselors

(57) ABSTRACT

A stator of a motor is provided with a stator core having a plurality of teeth and a plurality of windings wound around teeth of the stator core. The stator also has an insulator that is provided with a plurality of lead-out guide portions that enable lead-out wires of the windings to be drawn out from the tooth winding portions in a state of being close to the tooth winding portions.

4 Claims, 5 Drawing Sheets

STATOR OF MOTOR HAVING AN INSULATOR WITH LEAD OUT GUIDE PORTIONS

CROSS-REFERENCE TO RELATED APPLICATIONS

This U.S. National stage application claims priority under 35 U.S.C. §119(a) to Japanese Patent Application No. 2004-030263 the entire contents of which are hereby incorporated herein by reference.

TECHNICAL FIELD

The present invention relates to a stator of a motor.

BACKGROUND ART

An electric motor has a stator and a rotor which is rotatably placed in the stator. Conventionally, there is an electric motor whose stator has a stator core having a plurality of teeth and windings wound around the teeth of the stator core via insulators. The electric motor of this type is used as a motor for a compressor of an air conditioner and so on.

Windings are wound around the teeth. At this time, in order to insulate a crossover wire of each winding, an insulating tube, an insulating sleeve or the like is required. In an attempt to dispense with the insulating tube and so on, there is known a stator having insulators provided with grooves in which the crossover wires are housed, so that contact of the crossover wires of one phase with the crossover wires of the other phases is prevented (e.g., see JP 2002-101596 A).

More specifically, insulators on the lead wire side are each formed with a plurality of grooves, and in grooves of an insulator corresponding to a tooth at which a lead wire is raised from a crossover wire of one phase, crossover wires of the same phase but from other teeth are housed.

However, as shown in FIG. 6, if a winding 52 is wound around a tooth 51, a tooth winding portion 53 is formed. If a concentrated winding method like this is adopted, the tooth winding portion 53 takes a spindle shape and outer surfaces of adjacent tooth winding portions 53 come close to one another. Therefore, a take-out wire (lead-out wire) 54 of one phase is apt to be brought into contact with the adjacent tooth winding portion 53 of other phases, so that a stable function as a motor couldn't be exhibited.

SUMMARY OF THE INVENTION

This invention was made in order to solve the above conventional drawback, and an object of this invention is to provide a motor stator using insulators, which prevents a lead-out wire of one phase from being brought into contact with windings of other phases and thus has high quality.

A stator of a motor, according to the present invention, comprises a stator core having a plurality of teeth; windings, a part of each winding being wound around teeth of the stator core via an insulator; and lead-out guide portions provided in the insulator and enabling lead-out wires to be drawn out from corresponding tooth winding portions of the windings in a state of being close to the corresponding tooth winding portions.

In the stator of a motor with the above construction, since the lead-out guide portions that enable the lead-out wires to be drawn out from the tooth winding portions of the windings in the state of being close to the tooth winding portions are provided in the insulator, the lead-out wires of one phase are less likely to be brought into contact with the adjacent tooth winding portions of other phases. Therefore, the insulating property between the adjacent tooth winding portions is improved, thus making it possible to provide a motor with high quality. Moreover, it is not necessary for the take-out wires (lead-out wires) to be covered with a protective tube (insulating tube) and so on, thus making it possible to improve assembling performance as well as reduce costs.

In one embodiment, each winding includes tooth winding portions, a crossover wire, a neutral wire and a power wire; the winding is wound around one of two opposed teeth, starting at an end of one tooth winding portion that follows the neutral wire, and the crossover wire directed from another end of the tooth winding portion around the one tooth toward the other of the opposed teeth connects to the power wire, and at an end of a tooth winding portion to be around the other tooth that continues from the power wire the winding is wound around the other tooth, and another end of the tooth winding portion around the other tooth is connected to the neutral wire such that a lead-out portion from the one tooth winding portion to the other tooth winding portion and a lead-out portion from the other tooth winding portion to the neutral wire serve as the lead-out wires.

In the stator of this embodiment, since the lead-out portion from one tooth winding portion to the other tooth winding portion serves as a lead-out wire, it is possible to prevent the lead-out wire of one phase from being brought into contact with the adjacent tooth winding portions of other phases. Further, since the lead-out portion from the other tooth winding portion to the neutral wire serves as a lead-out wire, it is possible to prevent the lead-out wire from being brought into contact with the adjacent tooth winding portions of other phases. By this arrangement, contact between the different phases can be prevented, and a stable winding operation is enabled. Together with that, the stably wound state can be maintained, so that a motor with high quality is provided.

In one embodiment, each of the lead-out guide portions comprises a groove provided in the vicinity of a periphery of the corresponding tooth winding portion.

In the stator of the above embodiment, since the lead-out guide portion is formed of a groove provided in the vicinity of the periphery of the tooth winding portion, simplification of the structure can be attempted. Therefore, an improvement in the productivity and a further reduction in costs can be achieved.

DETAILED DESCRIPTION OF THE INVENTION

Figure 1:
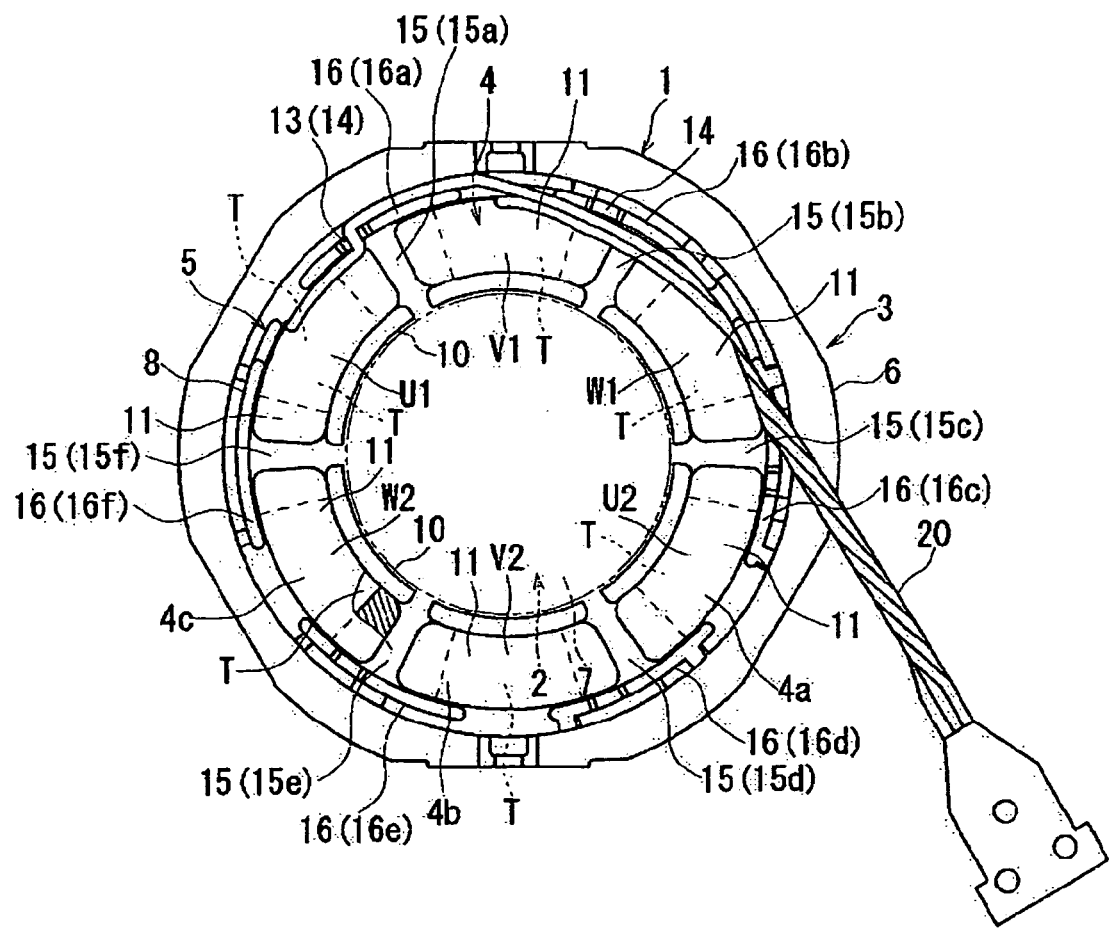
FIG. 1 is a plan view of a motor stator according to the present invention.

Next, a specific embodiment of the motor stator according to the present invention will be described below with reference to the drawings. FIG. 1 is a simplified view of essential parts of a motor in which the stator is used. The motor is constituted mainly of the stator 1 and a rotor 2 which is rotatably fitted in the stator 1. The stator 1 has a stator core 3 and windings 4 wound on the stator core 3. The stator core 3 has a core main body 6 formed by stacking a large number of annular-shaped thin plates made of electromagnetic steel and insulators (insulating members) 5, 5 provided on axial end surfaces of the core main body 6 (see FIGS. 1 to 3). The stator core 3 is provided with a plurality of teeth T (six in this case) at a predetermined pitch along a circumferential direction thereof. The windings 4 are wound on the respective teeth T. At this time, slots 15 are formed between adjacent teeth T along the circumferential direction. There are six slots 15 in this case, i.e., from a first slot 15a to a sixth slot 15f. In FIG. 1, reference numeral 20 denotes a lead wire in which U-, V-, and W-phase power wires are bundled.

The rotor 2 has a rotor core 7 and a plurality of magnets (not shown) embedded in the rotor core 7. A shaft (not shown) is inserted through and fixed by an axial hole of the rotor core 7. In this case, the rotor core 7 is formed by stacking a large number of annular-shaped thin plates made of electromagnetic steel.

Figure 2:
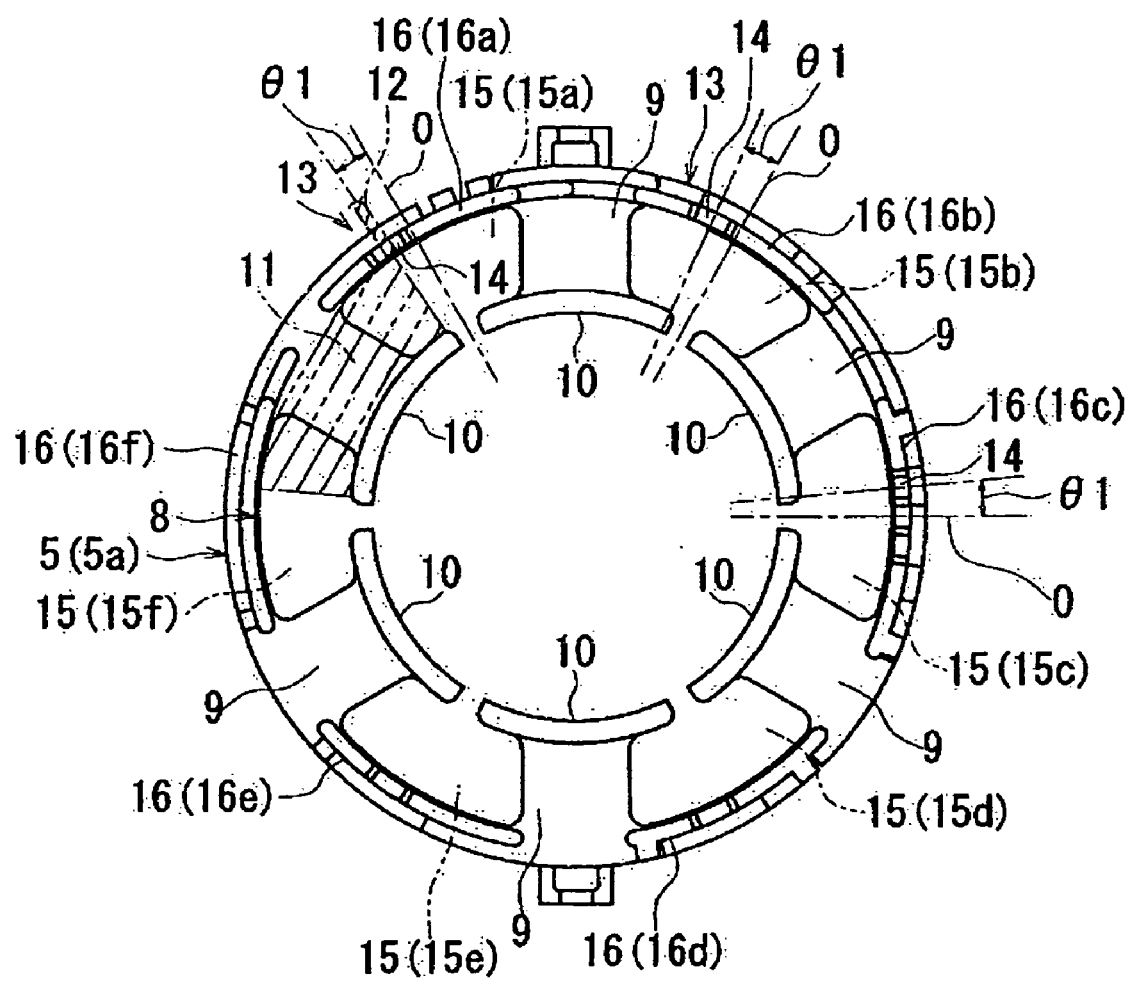
FIG. 2 is a plan view of an insulator of the stator.

As shown in FIG. 2, each of the insulators 5 includes a peripheral wall 8, a plurality of radially internally protruding portions 9 protruding from the peripheral wall 8, and raised portions 10 provided at an end edge of the radially internally protruding portions 9 to face the peripheral wall 8. The radially internally protruding portions 9 are arranged circumferentially at a predetermined pitch (at a pitch of 60°). One insulator 5 (5a) is fitted on one axial end surface of the core body 6, while the other insulator 5 (5b) is fitted on the other end surface of the core body 6.

Figure 4:
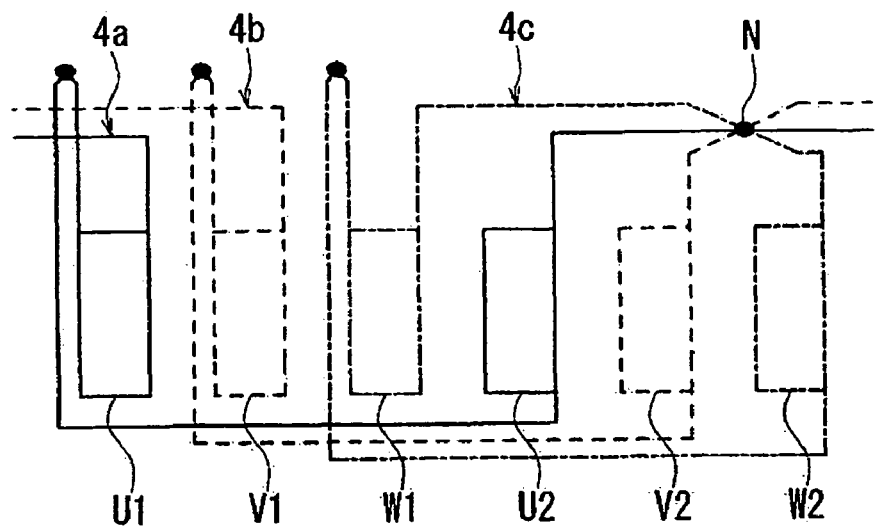
FIG. 4 is a circuit diagram showing a state of connection of windings of the stator.

The windings 4 consist of a U-phase winding 4a, a V-phase winding 4b and a W-phase winding 4c as shown in FIG. 4. The U-phase winding 4a has a first magnetic pole portion U1 and a second magnetic pole portion U2; the V-phase winding 4b has a first magnetic pole portion V1 and a second magnetic pole portion V2; and the W-phase winding 4c has a first magnetic pole portion W1 and a second magnetic pole portion W2. The U-phase winding 4a, the V-phase winding 4b and the W-phase winding 4c are connected to one another via a neutral point N. At this time, as shown in FIG. 1, the first magnetic pole portion U1 and the second magnetic pole portion U2 of the U-phase winding 4a are placed in such a manner as to be symmetrical with each other with respect to a central axis of the stator core 3 so that they are opposite to each other; the first magnetic pole portion V1 and the second magnetic pole portion V2 of the V-phase winding 4b are placed in such a manner as to be symmetrical with each other with respect to the central axis of the stator core 3 so that they are opposite to each other; and the first magnetic pole portion W1 and the second magnetic pole portion W2 of the W-phase winding 4c are placed in such a manner as to be symmetrical with each other with respect to the central axis of the stator core 3 so that they are opposite to each other.

Figure 5:
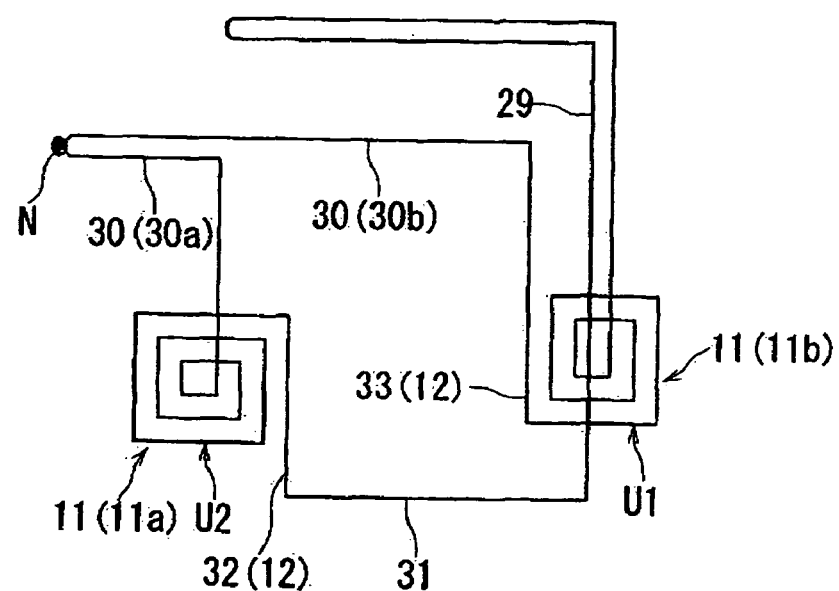
FIG. 5 is a simplified diagram for showing a winding method for the stator.
Figure 6:
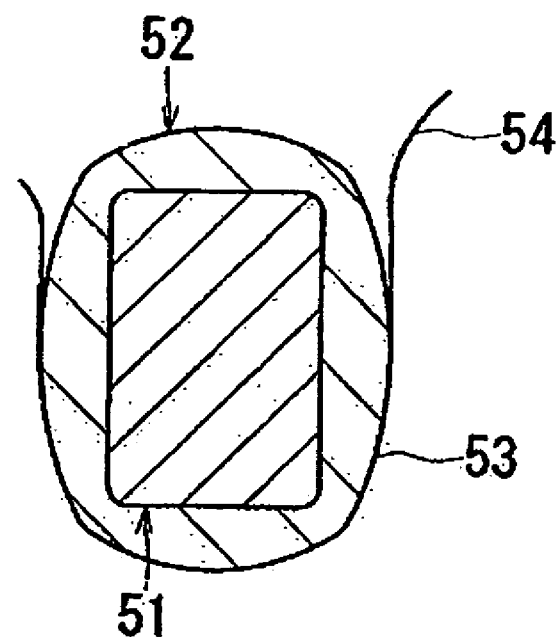
FIG. 6 is a simplified cross sectional view of essential parts of a conventional stator for describing its drawback.

The winding method will be described in detail regarding the U-phase winding 4a. As shown in FIG. 5, a part following a neutral wire 30 of the winding is wound around one of the opposed teeth T until after a tooth winding portion 11a serving as the second magnetic pole portion U2 is provided. A crossover wire 31 to the other tooth T is extended to serve as a power wire 29. Then, a part following the power wire 29 of the winding is wound around the other tooth T until after a tooth winding portion 11b serving as the first magnetic pole portion U1 is provided. A winding end at the other tooth T is drawn out toward the neutral wire 30 so as to be connected to the neutral wire. That is, the neutral wire 30a on the winding start side of the tooth winding portion 11a serving as the second magnetic pole portion U2 is connected to a neutral wire 30b on the winding end side of the tooth winding portion 11b serving as the first magnetic pole portion U1 via the neutral point N. The same winding method as that of the U-phase winding 4a is applied to the other V-phase winding 4b and W-phase winding 4c. Therefore, the second magnetic pole portion U2, V2, W2 of each winding 4a, 4b, 4c has a lead-out portion 32 drawn out to the first magnetic pole portion U1, V1, W1, and the first magnetic pole portion U1, V1, W1 has a lead-out portion 33 drawn out to the neutral wire 30 (30b).

Figure 3:
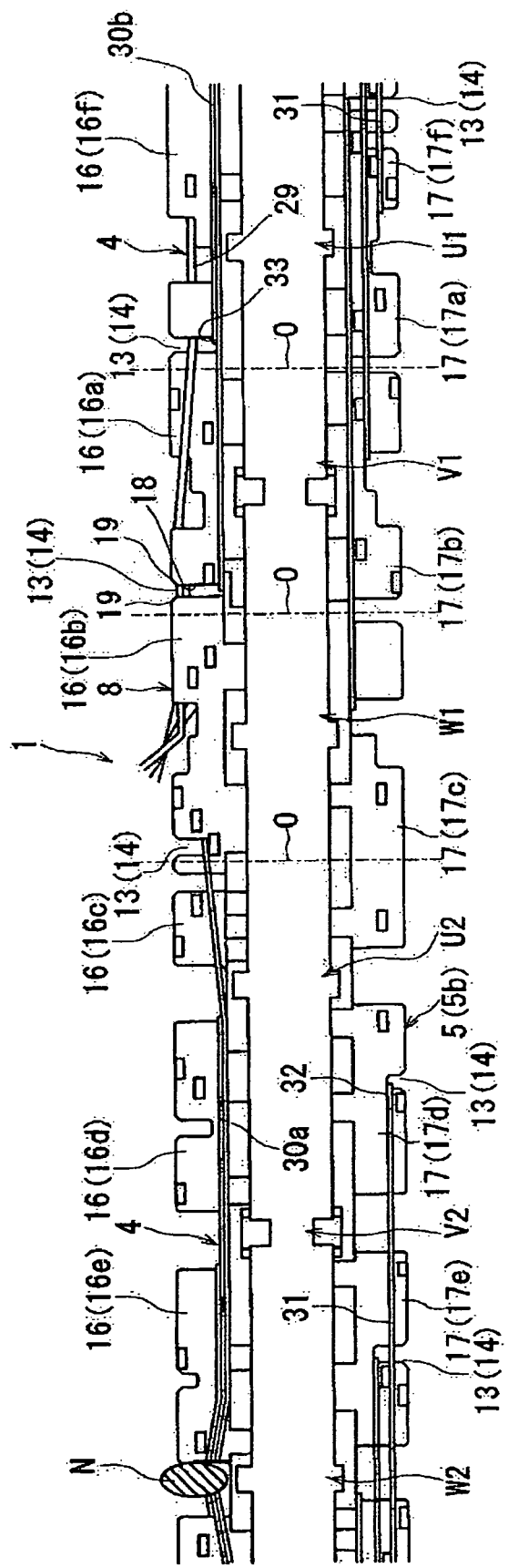
FIG. 3 is a side view of the insulators of the stator in a developed state.

One insulator 5a is provided with lead-out guide portions 13, which enable lead-out wires 12 to be drawn out from their respective tooth winding portions 11 in a state of being close to the respective tooth winding portions 11. In this case, the lead-out guide portions 13 can be each constructed of a groove 14 provided in the vicinity of the periphery of the corresponding tooth winding portion 11. That is, as shown in FIGS. 2 and 3, the peripheral wall 8 has a plurality of sub-walls 16 corresponding to slots 15 (namely, gaps defined between the circumferentially adjacent teeth T and T). Of the slots, a first slot 15a corresponds to a first sub-wall 16a, a second slot 15b corresponds to a second sub-wall 16b, a third slot 15c corresponds to a third sub-wall 16c, a fourth slot 15d corresponds to a fourth sub-wall 16d, a fifth slot 15e corresponds to a fifth sub-wall 16e, and a sixth slot 16f corresponds to a sixth sub-wall 16f. The grooves 14 are provided in the sub-walls 16a, 16b, and 16c, respectively. Each groove 14 is placed in a position nearer the corresponding tooth winding portion 11 (self-wound portion), from which the lead-out wire 12 is drawn out, in relation to the center O of the slot 15. The groove 14 consists of an axially extending main part 18 and notch portions 19, 19 at an open end of the main part 18.

In this case, as shown in FIG. 3, for example, the groove 14 formed in the first sub-wall 16a is shifted by a predetermined angle θ1 (e.g., about five degrees) relative to the center O of the first slot 15a in a counterclockwise direction. The groove 14 formed in the second sub-wall 16b is shifted by the predetermine angle θ1 (e.g., about five degrees) relative to the center O of the second slot 15b in the counterclockwise direction, and the groove 14 formed in the third sub-wall 16c is shifted by the predetermine angle θ1 (e.g., about five degrees) relative to the center O of the third slot 15c in the counterclockwise direction.

The other insulator 5b is also provided with sub-walls 17, of which a first sub-wall 17a corresponds to the first slot 15a; a second sub-wall 17b corresponds to the second slot 15b; a third sub-wall 17c corresponds to the third slot 15c, a fourth sub-wall 17d corresponds to the fourth slot 15d, a fifth sub-wall 17e corresponds to the fifth slot 15e, and a sixth sub-wall 17f corresponds to the sixth slot 15f. Also, the sub-walls 17d, 17e, 17f are each provided with the groove 14 serving as the lead-out guide portion 13.

In this case, for example, the groove 14 formed in the fourth sub-wall 17d, the groove 14 formed in the fifth sub-wall 17e, and the groove 14 formed in the sixth sub-wall 16f are each shifted by a predetermine angle (e.g., about five degrees) relative to the center O of the corresponding slots 15 in the clockwise direction. The lead-out portion 32, which is drawn out from the U-phase second magnetic pole portion U2 to the U-phase first magnetic pole portion U1, serves as the lead-out wire 12, and is drawn out via the groove 14 formed in the fourth sub-wall 17d of the insulator 5b. Also, the lead-out portion 33, which is drawn out from the U-phase first magnetic pole portion U1 to the neutral wire 30b, serves as the lead-out wire 12, and is drawn out via the groove 14 formed in the first sub-wall 16a of the insulator 5a. Similarly, the lead-out portion 32 that is drawn out from the V-phase second magnetic pole portion V2 to the V-phase first magnetic pole portion V1 serves as the lead-out wire 12, and is drawn out via the groove 14 formed in the fifth sub-wall 17e of the insulator 5b, and the lead-out portion 33 that is drawn out from the V-phase first magnetic pole portion V1 to the neutral wire 30b serves as the lead-out wire 12 and is drawn out via the groove 14 formed in the second sub-wall 16b of the insulator 5a. Also, the lead-out portion 32 that is drawn out from the W-phase second magnetic pole portion W2 to the W-phase first magnetic pole portion W1 serves as the lead-out wire 12, and is drawn out via the groove 14 formed in the sixth sub-wall 17f of the insulator 5b, and the lead-out portion 33 that is drawn out from the W-phase first magnetic pole portion W1 to the neutral wire 30b serves as the lead-out wire 12, and is drawn out via the groove 14 formed in the third sub-wall 16c of the insulator 5a.

This motor (which is of permanent magnet type) is used as, for example, a motor for a compressor of an air conditioner. The compressor includes a casing, which is a sealed container, a compressor elements part housed in the lower side of the sealed container, and a motor elements part housed in the upper side of the sealed container. The permanent magnet type motor is used for the motor elements part. Therefore, a shaft that is inserted through and fixed by the axial hole of the rotor 2 is a crankshaft for the compressor elements part, and the crankshaft is supported by a supporting member within the sealed container.

In the stator 1 constituted as described above, the lead-out wire 12 from the tooth winding portion 11 is fitted (engaged) in the groove 14 close to the tooth winding portion 11, whereby the lead-out wire 12 can be drawn out in a state of being close to the tooth winding portion 11. That is, the insulator 5 is provided with the lead-out guide portions 13 that enable the lead-out wires 12 to be drawn out from the tooth winding portions 11 of the windings 4 in a state of being close to the tooth winding portions 11. This makes the lead-out wire 12 of one phase less likely to be brought into contact with the tooth winding portions 11 of other phases, and the insulation between the adjacent tooth winding portions 11, 11 is improved. Thus, a motor with high quality can be provided. Moreover, it is not necessary for the take-out wires (lead-out wires) 12 to be covered with a protective tube (insulating tube) and so on, thus making it possible to improve assembling performance as well as reduce costs. In particular, in the stator in which the winding 4 is wound from its neutral wire 30 around one of the opposed teeth T, and the crossover wire 31 from the one tooth T to the other tooth T leads to the power wire 29, from which the winding 4 is wound around the other tooth T, and the winding end of the other tooth T is drawn out toward the neutral wire 30 and connected to the neutral wire 30, and the lead-out portion 32 from one tooth winding portion 11 to the other tooth winding portion 11 and the lead-out portion 33 from the other tooth winding portion 11 to the neutral wire 30 (30b) serve as the lead-out wires 12, it is possible to prevent the lead-out wire 12 of one phase extending from one tooth winding portion 11 to the other tooth winding portion 11 from being brought into contact with the adjacent tooth winding portions 11 of other phases. Also, it is possible to prevent the lead-out wire 12 extending from the other tooth winding portion 11 to the neutral wire 30 from being brought into contact with the adjacent tooth winding portions 11 of other phases, too. By this arrangement, a contact between the different phases can be prevented, and a stable winding operation is enabled, and also, since the stably wound state can be maintained, a motor with high quality can be provided.

Since the lead-out guide portion 13 can be formed of the groove 14 provided in the vicinity of the periphery of the tooth winding portion 11, simplification of the structure can be attempted. For that reason, an improvement in the productivity and a further reduction in the costs can be achieved. Also, the groove 14 has the notch portions 19, 19 at the open end of the main part 18, which is advantageous in that the lead-out wire 12 is easily engaged in the groove 14.

Embodiments of the invention being thus described, it will be obvious that the preset invention is not limited to those embodiments, but that same may be varied in many ways within the scope of the following claims. For example, the position of the groove 14 constituting the lead-out guide portion 13 is not limited to the shown one as far as the groove position allows the lead-out wire 12 to be drawn out in the vicinity of the tooth winding portion 11. Further, dimensions of the groove 14 such as a width and a depth can be set as desired as far as the lead-out wire 12 can be engaged with (fitted in) the groove 14. Furthermore, the number of the phases and the number of the poles may be changed, and the lead-out guide portion 13 may also be constituted of a hole or the like in the insulator.

What is claimed is:

1. A stator of motor comprising:
   a stator core having a plurality of teeth, said plurality of teeth including at least a first tooth and a second tooth radially opposed to each other;
   an insulator, the insulator including a pair of insulating members provided on axially opposite sides of the stator core; and
   a winding with part of the winding being wound about the first and second teeth of the stator core, with the insulator disposed between the stator core and the winding, said winding including
      a first tooth winding portion and a second tooth winding portion wound about the first tooth and the second tooth, respectively,
      a first neutral wire connected to an end of the first tooth winding portion,
      a first lead-out wire extending from another end of the first tooth winding portion,
      a crossover wire having one end connected to the first lead-out wire and extending to a position which is radially outside of the second tooth winding portion at which the crossover wire is on the second tooth winding portion,
      a power wire having a first portion with an end connected to another end of the crossover wire, and a second portion with an end connected to another end of the first portion and another end connected to an end of the second tooth winding portion,
      a second lead-out wire extending from another end of the second tooth winding portion, and
      a second neutral wire connected to the second lead-out wire,
   the insulator including a plurality of lead-out guide portions with each of the first and second lead-out wires being drawn out through one of the lead-out guide portions from a corresponding one of the tooth winding portions of the winding,
   each of the insulating members including a peripheral wall and a plurality of radially internally protruding portions protruding from the peripheral wall,
   the peripheral wall of each insulating member having a plurality of sub-walls in one-to-one correspondence to slots defined between the teeth of the stator core, and a lead-out guide portion corresponding to the first tooth winding portion of the winding being provided in a corresponding one of the sub-walls of one insulating member, and a lead-out guide portion corresponding to the second tooth winding portion of the winding being provided in a corresponding one of the sub-walls of the other insulating member.

2. The stator according to claim 1, wherein the lead out guide portions are aligned with circumferential edge portions of the teeth as viewed along radial directions of the lead out guide portions.

3. The stator according to claim 2, wherein the lead out guide portions have radially extending center lines that are offset from centers of slots formed between the teeth and the parts of the winding wound around the teeth.

4. The stator according to claim 3, wherein the radially extending center lines are offset about 5 degrees from centers of slots formed between the teeth and the parts of the winding wound around the teeth.

* * * * *